United States Patent Office 3,471,460
Patented Oct. 7, 1969

3,471,460
AMINE-MODIFIED HYDROCARBON POLYMERS
Richard Watkin Rees, Wilmington, Del., assignor to E. I. du Pont de Nemours and Company, Wilmington, Del., a corporation of Delaware
No Drawing. Continuation-in-part of application Ser. No. 168,839, Jan. 25, 1962. This application Aug. 30, 1965, Ser. No. 483,805
Int. Cl. C08f 27/08
U.S. Cl. 260—88.1                    13 Claims

ABSTRACT OF THE DISCLOSURE

Copolymers containing at least 50 mol percent ethylene and 0.2 to 25 mol percent alpha,beta-ethylenically unsaturated carboxylic acid are modified with diamines.

---

This application is a continuation-in-part of my application Ser. No. 168,839, filed Jan. 25, 1962, now abandoned.

The present invention relates to novel hydrocarbon polymers and, more particularly, to hydrocarbon polymers modified with diamines.

It is an object of the present invention to provide a new class of hydrocarbon polymer. It is a further object of the present invention to provide a new class of hydrocarbon polymers of greatly improved solid state properties. Other objects will become apparent hereinafter.

The objects of the present invention are accomplished by a diamine modified hydrocarbon copolymer comprising a copolymer of an alpha-olefin, having from 1 to 10 carbon atoms and being present in at least 50 mol percent concentration, with an alpha,beta-ethylenically unsaturated monocarboxylic acid of 3 to 8 carbon atoms present in a concentration of at least 0.2 mol percent which has been reacted with a diamine of at least 2 carbon atoms and a dissociation constant of less than $1 \times 10^{-8}$.

In a particular embodiment, the invention comprises a copolymer of an alpha-olefin having the general formula $RCH=CH_2$, where R is a radical selected from the class consisting of hydrogen and alkyl radicals having from 1 to 8 carbon atoms, the olefin content of said copolymer being at least 50 mol percent based on the copolymer and an alpha,beta-ethylenically unsaturated monocarboxylic acid, the acid monomer content of said copolymer being from 0.2 to 25 mol percent based on the copolymer and at least part of said carboxylic acid being in the ionized form, —COO⁻, said copolymer containing attached to said ionized carboxyl groups, —COO⁻, a diamine radical having the general formula

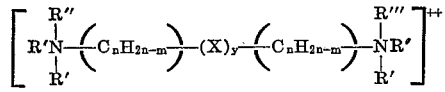

wherein R′ is selected from the class consisting of hydrogen and alkyl radicals having from 1 to 5 carbon atoms, R″ and R‴ are selected from the group consisting of hydrogen, alkyl radicals having from 1 to 5 carbon atoms and alkylene radicals having from 2 to 10 carbon atoms when R″ and R‴ are combined, n is an integer of at least one, preferably of 1 to 10, m is an integer of 0 to 4, inclusive, where X is selected from the group consisting of a divalent oxygen radical, a divalent sulfur radical, an imine radical, a carbonyl radical, and a phenylene radical, and y is 0 or 1, the quantity of the said diamine radical being sufficient to neutralize at least 10% of the said carboxylic acid.

The alpha-olefin polymers employed in the formation of the diamine modified copolymers of the present invention are copolymers of alpha-olefins with ethylenically unsaturated monocarboxylic acids. As indicated, the alpha-olefins employed in the copolymer are alpha-olefins which have the general formula $RCH=CH_2$, where R is either a hydrogen or an alkyl group having preferably from 1 to 8 carbon atoms. Thus, suitable olefins include ethylene, propylene, butene-1, pentene-1, hexene-1, heptene-1, 3-methylbutene-1, 4-methylpentene-1, etc. Although copolymers of olefins having higher carbon numbers can be employed in the present invention, they are not resins which are readily obtained or available. The concentration of the alpha-olefin is at least 50 mol percent in the copolymer and is preferably greater than 80 mol percent.

The second essential component of the base copolymer comprises an alpha,beta-ethylenically unsaturated monocarboxylic acid having preferably from 3 to 8 carbon atoms. Examples of such monomers are acrylic acid, methacrylic acid, ethacrylic acid and similar monocarboxylic acids. As indicated, the concentration of the acidic comonomer in the copolymer is from 0.2 mol percent to 25 mol percent, and preferably from 1 to 10 mol percent.

The base copolymers employed in forming the diamine modified copolymers of the present invention may be prepared in several ways. Thus, the copolymers may be obtained by the copolymerization of a mixture of the olefin and the carboxylic acid monomer. This method is preferred for the copolymers of ethylene employed in the present invention. Methods employed for the preparation of ethylene-carboxylic acid copolymers have been described in the literature. In a preferred process, a mixture of the two monomers is introduced into a polymerization environment maintained at high pressures, 50 to 3000 atmospheres, and elevated temperatures, 150 to 300° C., together with a free radical polymerization initiator, such as a peroxide. An inert solvent for the system such as water or benzene may be employed, or the polymerization may be substantially a bulk polymerization.

The present invention, however, is not limited to copolymers obtained by direct copolymerization of an alpha-olefin with an alpha,beta-ethylenically unsaturated carboxylic acid comonomer. Copolymers of alpha-olefins with carboxylic acids may also be prepared by copolymerization of the olefin with an alpha,beta-ethylenically unsaturated carboxylic acid derivative which, subsequently or during copolymerization, is reacted either completely or in part to form the free acid. Thus, hydrolysis, saponification or pyrolysis may be employed to form an acid copolymer from an ester copolymer.

The base copolymers employed to form the diamine modified copolymers are preferably of high molecular weight in order to achieve the outstanding physical properties that are obtainable with the compositions of the present invention. The molecular weight of the copolymers useful as base resins is most suitably defined by melt index, a measure of melt viscosity, described in detail in ASTM–D–1238–57T. The melt index of copolymers employed in the formation of the diamine modified polymers of the present invention is preferably in the range of 0.1 to 100 g./10 minutes and, more particularly, in the range of 1.0 to 20 g./10 minutes.

The base copolymer need not necessarily comprise a two component polymer. Thus, although the olefin content of the copolymer should be at least 50 mol percent, more than one olefin can be employed to form the hydrocarbon nature of the copolymer base. Additionally, any third copolymerizable monomer in the amount of 0–49.8 mol percent can be employed in combination with the olefin and the carboxylic acid comonomer. The scope of base copolymers suitable for use in the present invention is illustrated by the following examples: ethylene/acrylic acid copolymers, ethylene/methacrylic acid copolymers, ethylene/acrylic acid/methyl methacrylate copolymers, ethylene/methacrylic acid/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/acrylic acid/vinyl methyl ether copolymers, ethylene/vinyl chloride/methacrylic acid copolymers, ethylene/vinylidene fluoride/acrylic acid copolymers. It is apparent that each of the other monomers polymerized with ethylene and the acid is monoethylenically unsaturated.

The copolymers may also, after polymerization, but prior to diamine modification, be further modified by various reactions to result in polymer modifications which do not interfere with the action of the diamine. Halogenation of an olefin/acid copolymer is an example of such polymer modification.

The preferred base copolymers, however, are those obtained by the direct copolymerization of ethylene with a monocarboxylic acid comonomer in the absence or presence of a third copolymerizable monoethylenically unsaturated monomer. These resins are preferred because they contain the acid in a random distribution throughout the copolymer. Such random distribution enhances the effect of diamine modification significantly.

The resins of the present invention are obtained by the reaction of the described copolymer base with a diamine. It has been determined that the diamines react with the acid groups of the copolymer to form an ammonium salt structure in which the two nitrogens of the diamine exist in the ionized tetravalent ammonium state and in which the carboxylic acid group exists in its ionized form. A comparison of the infrared spectrum of the copolymer base with that of the diamine modified copolymer shows the appearance of an absorption band at about 6.4 micron which is characteristic of the ionized carboxyl group, —COO$^-$, a decrease in the crystallinity band at 13.7 micron and a substantial decrease, depending on the degree of neutralization, of a band at 10.6 micron, characteristic of the unionized carboxyl group, —COOH.

Although it has been known heretofore in the art that diamines can be reacted with carboxylic acid group containing polymers in all instances a cross-linked polymer was obtained. The characteristic difference of the diamine modified copolymers of the present invention is in the molecular weight of the copolymer which is not modified by the reaction of the diamine with the carboxylic acid base copolymer. The tentative explanation given for this unusual behaviour of the copolymers of the present invention is that the reaction of the diamine with the acid copolymer is intramolecular rather than intermolecular. The properties which are changed and improved, however, are such physical properties as stiffness, weatherability, tensile properties, resiliency and optical properties.

The change in properties resulting from the modification of the base copolymer with diamines is influenced by the degree of reaction between the carboxylic acid group and the diamine, the nature of the diamine and the nature of the carboxylic acid copolymer. Although an improvement in the mechanical properties described above is obtained with even a small percentage of the acid group reacted with a diamine, in general, a noticeable improvement is observed only after at least 10% of the acid groups have reacted with the diamine. However, to obtain the optimum physical properties which are derivable from diamine modified copolymers, it is generally desirable to react at least 50% of the acid groups with diamine groups. The degree of reaction of the diamine with the carboxylic acid copolymers is readily measured by infrared analysis of the changes resulting particularly in the bands hereinabove described. It is believed that the diamine can react with either one or two acid groups depending on the spacing of the amine and acid groups. The improvement in properties obtained by the reaction of the diamine with the carboxylic acid group increases with the addition of further quantities of the diamine up to about 200% of the stoichiometric quantity of diamine needed to react with all carboxylic acid groups in the copolymer. Further addition of diamine to the copolymer under reaction conditions does not appear to appreciably enhance the properties improved by the addition of the diamine. It will be readily apparent that it is preferred to employ a high degree of reaction between the carboxylic acid group of the copolymer and the diamine in those situations where the acid content of the copolymer is low. At high acid concentrations, the degree of reaction is not as critical. A further consideration in selecting a diamine to react with a carboxylic acid copolymer is the chain length of the diamine. Thus, a short chain diamine will be more efficient in copolymers having a higher concentration of carboxylic acid groups while a long chain diamine is equally efficient in its reaction with a high carboxylic acid content copolymer and a low carboxylic acid content copolymer. The best explanation for this phenomenon is the fact that the diamine reacts intramolecularly with the acid copolymer and that hence, in an acid copolymer of low acid content a short diamine has less opportunity to react with two carboxylic acid groups than a long chain diamine.

In order to achieve the reaction of the diamine with the carboxylic acid group of the copolymer to form the ionized ammonium salt structure characteristic of the modified copolymers of the present invention, it is essential to employ diamines of strong basicity. In particular, it was found that diamines which have dissociation constants below $10^{-8}$ are not suitable for this purpose. Diamines which have a dissociation constant to above $10^{-8}$, i.e. are more dissociated, are suitable reagents to form the improved resins of the present invention. The preferred diamines, which are suitable as reagents in forming the diamine modified copolymers, have the general formula

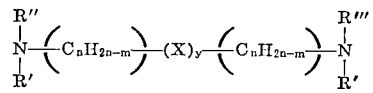

in which R' is a hydrogen or an alkyl radical having from 1 to 5 carbon atoms, R" and R''' are hydrogen or alkyl radicals having from 1 to 5 carbon atoms, or can be combined into a divalent alkylene radical of 1 to 10 carbon atoms, and where X is an oxygen radical, a sulfur radical, a phenyl radical, or an imine radical, and where $n$ is an integer of at least 1 and preferably between 1 and 10, and $m$ an integer of 0 to 4, and $y$ is zero or 1. It will be apparent from the foregoing formula that primary, secondary, and tertiary amines are operative reagents in forminng the diamine modified copolymers of the present invention, and that the diamines preferably have from 2 to 20 carbon atoms between the amine groups. The nature of X is not critical and, as can be seen from the foregoing definition of X, it can differ greatly in its chemical structure. The preferred diamines employed as modifiers for the copolymers are aliphatic diamines such as ethylene diamine, tetramethylene diamine, hexamethylene diamine, octamethylene diamine, bis-(p-amino cyclohexyl)-methane and decamethylene diamine. However, other diamines are equally useful and include piperazine, diethylene triamine, beta,beta'-diaminodiethyl ether, beta,beta'-diaminodiethyl thioether, phenylene diethyl amine and similar diamines.

The diamines may also be added to the copolymers of the present invention in the form of their ammonium salts which have the general formula

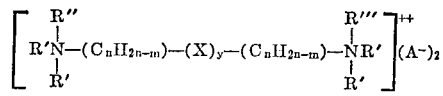

wherein R', R", R''', X, y, m and n have the same meaning as above and where A$^-$ is an acid radical. The reaction of the ammonium salts with the acid copolymers employed as reagents in the present invention differs slightly. In the reaction of the diamine with the carboxylic acid group to form the ammonium salt and thereby the diamine modified copolymer, no by-products of any kind are formed. However, in the reaction of the described ammonium salt with the carboxylic acid group of the copolymer to result in the diamine modified copolymer, a side product $H^+A^-$ is formed. Since this reaction is an equilibrium reaction, it is necessary in order to drive the reaction to completion and to obtain the ammonium salt formation with the acid groups of the copolymer, that the product $H^+A^-$ be of such a nature that it can be readily and completely removed from the reaction environment. It is, in general, therefore preferred to employ ammonium salts in which the acid radical forms a product with the hydrogen of the carboxylic acid group of the copolymer which can be readily volatilized from the reaction mixture at reaction conditions. In particular, diammonium formates, acetates, methoxides, ethoxides, carbonates, and bicarbonates are preferred. The product of these acidic radicals with hydrogen can be readily volatilized from a reaction mixture of the ammonium salt and the base copolymer. The reaction product of the acid copolymer and a diamine is identical to the reaction product obtained from the reaction of the base copolymer with an ammonium salt in which the acid radical is volatilized during the reaction with a base copolymer. Hence, both reaction products are considered diamine-modized carboxylic acid copolymers.

The reaction of the diamines with the base copolymer is carried out under conditions which allow a homogeneous distribution of the diamine in the base copolymer. No particular reaction conditions are essential, except that, where the diammonium salt is employed, the reaction conditions should be such that the $H^+A^-$ reaction product is removed from the reaction mixture, preferably by volatilization. Since the homogeneous distribution of the diamine and the removal of the $H^+A^-$ reaction side product, when a diammonium salt is employed, are difficult at room temperature, elevated temperatures are generally employed. More specifically, the diamine reaction is carried out by belt blending the polymer using the various techniques which have been developed in the art. Thus, the material may be blended on a rubber mill or in the many types of melt blend mixers which are known in the art. The base copolymer may also be dissolved in a suitable solvent and then mixed with a diamine or a solution of a diamine at elevated temperatures. Since the reaction of the diamine with a carboxylic acid base copolymer does not result in a side product when the diamine itself is employed, this reaction can also be carried out in closed vessels and, particularly, can be carried out in an extruder in which the copolymer is fabricated. Where the reaction is carried out in contact with air, care must be taken that the reaction temperature is not excessively high. It was found that if the reaction temperature exceeds 300° C. the reaction of the diamine with the carboxylic acid group of the copolymer base does not lead to diamine modified copolymers but forms a crosslinked intractible resin. The explanation for this result may be that the reaction of the diamine has proceeded beyond the ammonium salt formation and has resulted in the formation of amide structures. It is to be understood, however, that the specific technique employed in forming the diamine modified copolymers of the present invention is not critical and that various modifications of the techniques above described will be apparent to one skilled in the art.

The following examples further illustrate the preparation of the diamine modified copolymers of the present invention and the improved physical properties obtained by this modification. Unless otherwise stated, the copolymers employed in the examples were obtained by direct copolymerization.

EXAMPLES 1 TO 6

Solutions of 50 g. batches of an ethylene/methacrylic acid copolymer containing 10 weight percent of methacrylic acid and having a melt index of 5.8 g./10 min. (ASTM-1238-57T) in 250 ml. of xylene were prepared and reacted with 0.5, 1.0, 2.5, 5, and 7.5 g. of hexamethylene diamine at 130° C. In each of the six additions, the reaction mixture was agitated for 15 minutes. The addition of the hexamethylene diamine to any of the six solutions did not cause an increase in viscosity. The products were recovered by precipitation with methanol and washed with water and acetone. The resulting dry products were compression molded into 60 mil sheets and the physical properties described in Table I were measured.

TABLE I

| Example | Percent Hexamethylene diamine | | Melt index in g./10 min. | Stiffness in p.s.i.[1] | Yield strength in p.s.i.[2] | Ultimate tensile strength[2] in p.s.i. | Elongation[2] in percent | Transparency (visual) | Resilience (bend recovery) |
|---|---|---|---|---|---|---|---|---|---|
| | Weight | Stoichiometric | | | | | | | |
| 1 | 0 | 0 | 5.8 | 9,900 | 890 | 3,414 | 550 | Hazy | Limp. |
| 2 | 1 | 15 | 3.9 | 18,950 | 1,100 | 3,525 | 440 | Slight haze | Fair. |
| 3 | 2 | 30 | 4.9 | 20,340 | 1,130 | 3,740 | 443 | Very slight haze | Do. |
| 4 | 5 | 74 | 4.8 | 24,220 | 1,320 | 3,880 | 450 | Transparent | Good. |
| 5 | 10 | 148 | 5.2 | 38,400 | 1,600 | 3,423 | 370 | ___do___ | Very good. |
| 6 | 15 | 223 | 5.2 | 40,000 | 1,734 | 3,560 | 380 | ___do___ | Do. |

[1] ASTM-D-747-58T. [2] ASTM-D-412-51T.

EXAMPLES 7 TO 10

The ethylene/methacrylic acid copolymer employed in the foregoing examples was extruded through a two inch extruder equipped with mixing torpedoes and an injection device in the extruder barrel. The resin was extruded at 30 r.p.m. (screw speed) and a melt temperature of 170 to 180° C. Hexamethylene diamine in the concentration indicated was injected into the mixing section of the extruder. The stiffness and tensile properties of the resulting products obtained at the three levels of hexamethylene diamine concentration were determined on 60 mil sheets made from the extruded product. The data obtained are shown in Table II and compared with the unmodified copolymer. It was observed that in the experiment in which 10 weight percent of hexamethylene diamine was added the mixing action of the extruder employed was insufficient to assure complete distribution and reaction of the hexamethylene diamine added. The addition of the hexamethylene diamine in all three concentrations did not significantly affect the extrusion behavior of the copolymer.

TABLE II

| Example | Weight percent hexamethylene diamine | Melt index in g./10 min. | Stiffness in p.s.i.[1] | Yield strength in p.s.i.[1] | Ultimate strength in p.s.i.[2] | Elongation in percent[2] |
|---|---|---|---|---|---|---|
| 7 | | 5.8 | 9,900 | 890 | 3,414 | 530 |
| 8 | 3 | 5.07 | 26,110 | 1,530 | 3,670 | 470 |
| 9 | 5 | 7.04 | 27,000 | 1,960 | 4,000 | 460 |
| 10 | 10 | 7.2 | 29,000 | 1,680 | 3,730 | 450 |

[1] ASTM-D-747-58T. [2] ASTM-D-412-57T.

EXAMPLE 11

To a solution of 50 g. of an ethylene/acrylic acid copolymer containing 5 weight percent of acrylic acid and having a melt index of 10 g./10 min. in 250 ml. of xylene maintained at a temperature of 130° C. was added 3 g. of hexamethylene diamine and the resulting reaction mixture was agitated for 15 minutes at the temperature indicated. The product was recovered by precipitation with methanol and washed thoroughly with water and acetone. The dried diamine copolymer was compression molded and was found to have a significantly higher transparency than the unmodified copolymer tested under the same conditions. The resiliency of the modified copolymer was greatly increased by the reaction of the diamine with the copolymer.

EXAMPLE 12

Fifty grams of ethylene/methacrylic acid copolymer containing 10 weight percent methacrylic acid having a melt index of 5.8 g./10 min. were dissolved in 250 ml. of xylene containing 5 g. of $$NH_2-CH-CH_2-S-S-CH_2-CH-NH_2$$
$$\phantom{NH_2-}CH_3 \phantom{-S-S-CH_2-}CH_3$$

The solution was heated to 130° C. for 15 min. with agitation. The product was recovered by precipitation with methanol and washed thoroughly with water and acetone. The resulting product was dried and compression molded into 60 mil sheets. The physical properties are tabulated after Example 13, and there compared to the ethylene/acid copolymer. An infra-red scan shows peaks at 6.4 and 6.7μ.

EXAMPLE 12-A

The process of Example 12 was repeated using a diamine having the formula

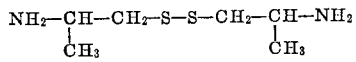

$H_2N-CH_2-CH_2-CH_2-O-CH_2-CH_2-CH_2-NH_2$ (bis propylamine ether). The physical properties are set forth in tabulated form after Example 13. An infra-red scan showed peaks at 6.4 and 6.7μ.

EXAMPLE 13

The process of Example 12 was repeated using

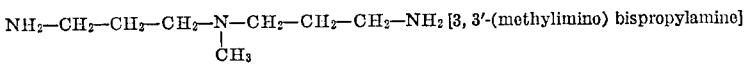

$NH_2-CH_2-CH_2-CH_2-N-CH_2-CH_2-CH_2-NH_2$ [3, 3'-(methylimino) bispropylamine]
$\phantom{NH_2-CH_2-CH_2-CH_2-}|$
$\phantom{NH_2-CH_2-CH_2-CH_2-}CH_3$ The physical properties of this product are tabulated below. An infra-red scan showed peaks at 6.4 and 6.7μ.

|  | Example 12 | Example 12-A | Example 13 | Ethylene/ acid copolymer |
|---|---|---|---|---|
| Stiffness (p.s.i.) | 19,400 | 22,000 | 15,000 | 10,000 |
| Yield point (2″ per min.) | 1,234 | 1,350 | 1,199 | 889 |
| Tensile strength (p.s.i.) | 3,220 | 3,450 | 3,500 | 3,400 |
| Elogation at break, percent | 433 | | 447 | 550 |
| Melt index | 5.9 | 5.5 | 4.7 | 5.8 |

EXAMPLES 14 TO 17

Using the reaction procedure set forth in Examples 1 to 6, an ethylene/methacrylic acid copolymer containing 18 weight percent of methacrylic acid and having a melt index of 6.3 g./10 minutes was treated with 5, 10, and 18% by weight of hexamethylene diamine. Molded samples of the resulting isolated diamine modified copolymer were found to be transparent and resilient. The modified copolymers were subjected to tensile and stiffness test. The results shown in Table III were obtained.

TABLE III

| Example | Wt. percent hexamethylene diamine | Melt index in g./10 min. | Stiffness in p.s.i.[1] | Yield strength in p.s.i.[2] | Ultimate strength in p.s.i.[2] | Ultimate elongation in p.s.i.[2] |
|---|---|---|---|---|---|---|
| 14 | 0 | 6.3 | 16,400 | 1,440 | 5,000 | 500 |
| 15 | 5 | 2 | 36,600 | 1,740 | 5,300 | 350 |
| 16 | 10 | 1.5 | 46,140 | 1,950 | 4,850 | 340 |
| 17 | 18 | 1 | 63,380 | 2,470 | 5,200 | 300 |

[1] ASTM-D-747-58T.  [2] ASTM-D-412-57T.

EXAMPLES 18 TO 25

Employing the procedure of Examples 1 to 6 with the methacrylic acid copolymer therein used, the diamines listed in the table below were reacted with the acid copolymer to result in diamine modified copolymers. The resulting products were compression molded into 60 mil sheets and compared to the unmodified copolymer in their melt index, stiffness and tensile properties. The resulting data are compared in Table IV. As can be seen from these data, paraphenylene diamine having a dissociation constant of $1 \times 10^{-8}$ results in a diamine modified copolymer which shows borderline improvement over the unmodified polymer. This borderline improvement is further apparent from the transparency of the modified copolymer as well as its infrared spectrum and its resiliency.

TABLE IV

| Example | Diamine Type | Wt. percent | Diss. const. | Melt index in g./10 min. | Stiffness in p.s.i.[1] | Yield strength in p.s.i.[2] |
|---|---|---|---|---|---|---|
| 18 | | | | 5.8 | 9,900 | 90 |
| 19 | Diethylene triamine | 4 | | 3.5 | 22,700 | 1,310 |
| 20 | Ethylene diamine | 3.5 | | 5.8 | 13,300 | 1,155 |
| 21 | Piperazine | 20 | $6.4 \times 10^{-5}$ | 5.4 | 18,000 | 1,170 |
| 22 | p-phenylene diamine | 25 | $1.1 \times 10^{-8}$ | 5.3 | 16,100 | 1,160 |
| 23 | N,N'-diisopropyl hexamethylene diamine | 12 | | 5.3 | 29,000 | 1,800 |
| 24 | Decamethylene diamine | 12 | | 4.9 | 31,440 | 1,730 |
| 25 | N,N'-tetramethyl hexamethylene diamine | 15 | | 5.5 | 28,000 | 1,400 |

[1] ASTM-D-747-58T.  [2] ASTM-D-412-57T.

EXAMPLE 26

An ethylene/methacrylic acid copolymer containing 18 weight percent of methacrylic acid and having a melt index of 6.3 g./10 min. was modified with 18 weight percent of diethylene triamine using the solution procedure described in the foregoing examples. The resulting diamine modified copolymer was found to have a stiffness of 43,650 p.s.i. compared to a stiffness of 16,400 p.s.i. for the unmodified copolymer and an ultimate strength of 5,200 p.s.i. compared to an ultimate strength of 5,000 p.s.i. for the unmodified polymer.

EXAMPLE 27

Example 26 was repeated except that instead of the diethylene triamine, ethylene diamine was employed. The resulting diamine modified copolymer was found to have a stiffness of 41,650 p.s.i., as compared to a stiffness of 16,400 p.s.i. for the unmodified coploymer.

EXAMPLES 28 TO 31

To a solution of 50 g. of an ethylene/fumaric acid copolymer containing 7 weight percent of fumaric acid and having a melt index of 7.8 g./10 min., dissolved in 250 cc. of xylene was added 5 g. of hexamethylene diamine at a temperature of 100° C. The reaction mixture was agitated for 15 minutes at that temperature. The resulting reaction product was isolated from the xylene by precipitation with methanol.

The example was repeated with an ethylene/maleic anhydride copolymer containing 7 weight percent of maleic anhydride and having a melt index of 4.7 g./10 minutes.

The melt index, stiffness and tensile properties of the so-modified copolymers were measured and compared to the unmodified copolymers. The results of the comparison are summarized in Table V below.

pression molded and stiffness and tensile properties measured. The melt index of the modified copolymer was 2.8 g./10 min. The stiffness of the modified copolymer was measured to be 24,400 p.s.i. as compared to 9,900 p.s.i. for unmodified copolymer. The yield strength was measured to be 1420 p.s.i. as compared to 890 p.s.i. for the unmodified copolymer. The transparency of the modified copolymer was greatly improved over that of the unmodified copolymer on the basis of molded samples.

EXAMPLE 35

Employing the procedures of Examples 1 to 6, 50 g. of an ethylene/methacrylic acid copolymer containing 10% by weight of methacrylic acid and having a melt index of 5.8 g. was reacted with 5 g. of bis(p-aminocyclohexyl) methane. The product was isolated by methanol precipitation. The resulting dried product was compression molded and stiffness and tensile properties were measured. The melt index of the modified copolymer was 4.4 g.%10 min. The stiffness of the modified copolymer was measured to be 40,400 p.s.i. as compared to 9,900 p.s.i. for the unmodified copolymer. The yield strength was measured to be 1,880 p.s.i. as compared to 890 p.s.i. for the unmodified copolymer. The transparency of the modified copolymer was greatly improved over that of the unmodified copolymer on the basis of molded samples.

TABLE V

| Example | Comonomer | Hexamethylene diamine in wt. percent | Melt index in g./10 min. | Stiffness in p.s.i.[1] | Yield strength in p.s.i.[2] | Elongation in percent[2] |
| --- | --- | --- | --- | --- | --- | --- |
| 28 | Fumaric acid | | 7.8 | 22,150 | 1,230 | 420 |
| 29 | do | 10 | No flow | 15,700 | 1,130 | 80 |
| 31 | Maleic anhydride | | 4.7 | 26,790 | 1,435 | 350 |
| 31 | do | 10 | No flow | 17,600 | 1,115 | 80 |

[1] ASTM-D-747-58T.  [2] ASTM-D-412-57T.

As is apparent from the foregoing table, dicarboxylic acids do not form the diamine modified copolymers of the present invention but result in crosslinked products of inferior stiffness and inferior tensile properties.

EXAMPLE 32

Employing an ethylene/methacrylic acid copolymer containing 10 percent by weight of methacrylic acid and having a melt index of 5.8 g./10 minutes modified with 3 weight percent of hexamethylene diamine, 4 oz. Boston round bottles were prepared. The resin was extruded through a 2-inch extruder fitted with a crosshead tubing die (outer diameter $^{11}/_{16}$ inch, inter diameter ½ inch) and blown into a bottle using a 4 oz. Boston round bottle mold. The resin was heated to a temperature of 140° C. in the extruder. The mold was maintained at room temperature. The extrusion screw speed was 25 r.p.m. The bottles obtained were stiffer and more transparent than bottles made under the same conditions with the unmodified copolymer.

EXAMPLE 33

Using the copolymer of Example 31 modified with 5 weight percent of hexamethylene diamine, injection molded combs, chain rings, gears, coils, coil forms and chips were made. A 1 oz. machine fitted with a ⅞-inch cylinder was employed. The machine was operated at a cylinder temperature of 140° and the mold was maintained at room temperature. Pressures ranging from 3000 to 6000 p.s.i. and a 30 second cycle where found to be adequate. The moldings were tough and transparent and reproduced the finest details of the molds employed.

EXAMPLE 34

Employing the procedure of Examples 1 to 6, 50 g. of an ethylene/methacrylic acid copolymer containing 10% by weight of methacrylic acid and having a melt index of 5.8 g./10 min. was reacted with 15 g. of hexamethylene diamine diacetate. The product was isolated by methanol precipitation and dried. The modified copolymer was com- The foregoing examples of experimental data have demonstrated the surprising improvement of solid state properties obtained with the diamine modified copolymers of the present invention. One of the more apparent improvements obtained is that of transparency. Hydrocarbon polymers are generally not transparent in all but exceptionally thin forms and even there special techniques such as quenching and drawing must be employed to obtain a measure of transparency. The copolymers of the present invention, however, can be made to be transparent even in thick molded sections. Another solid state property which is markedly improved by diamine modification is the resilience or the bend recovery of the copolymer. In contrast to the hydrocarbon polymers which have a slow and incomplete recovery from bend, the copolymers of the present invention snap back into form and assume their original shape. The improvement obtained in tensile properties and stiffness is apparent from the data presented in the tables. Other solid state properties improved by diamine modification are toughness, stress crack resistance and weatherability.

The copolymers of the present invention can be fabricated by the techniques generally developed for the fabrication of polyolefins such as melt extrusion, injection molding, compression molding, blow molding, vacuum molding, film extrusion, extrusion coating and wire coating. The products of the present invention are particularly suitable for injection molding because they result in molded shapes of higher transparency. They are exceedingly useful in the preparation of films and wire coatings because of their higher toughness and weatherability.

The ionic copolymers of the present invention may be modified, if desired, by the addition of antioxidants, stabilizers, fillers, pigments, and other additives commonly employed in hydrocarbon polymers. Extruded film and pipe of the present invention can be biaxially or uniaxially oriented to further increase the physical properties of the extruded object. Many other uses and modifications of the diamine modified copolymers of the present invention will be apparent from the foregoing description. It is not intended to exclude such from the scope of this invention.

I claim:

1. A diamine modified high molecular weight, random, direct copolymer of (1) at least 50 mol percent ethylene, (2) 0.2 to 25 mol percent alpha,beta-ethylenically unsaturated monocarboxylic acid having from 3 to 8 carbon atoms, and, optionally, (3) a monoethylenically unsaturated other monomer, said copolymer having at least part of the acid in the ionized form, —COO⁻, and containing attached to said ionized carboxyl groups, —COO⁻, a diamine radical having the general formula

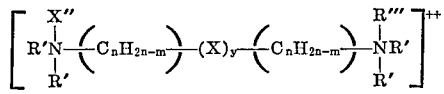

where R′ is a radical selected from the group consisting of hydrogen and alkyl radicals having from 1 to 5 carbon atoms, R″ and R‴ are radicals selected from the group consisting of hydrogen, alkyl radicals having from 1 to 5 carbon atoms, and alkylene radicals having from 1 to 10 carbon atoms when R″ and R‴ are combined, X is selected from the group consisting of oxygen, sulfur, imine radicals, carbonyl radicals and phenylene radicals, $y$ is zero or 1, $m$ is an integer of 0 to 4 and $n$ is an integer of 1 to 10, said diamine radical being present in sufficient quantity to neutralize at least 10% on a stoichiometric basis of the said acid groups of said copolymer.

2. The diamine modified copolymer of claim 1 wherein X of the diamine is a carbon-to-carbon bond.

3. The diamine modified copolymer of claim 1 wherein X of the diamine is —NH—.

4. The diamine modified copolymer of claim 2 wherein the diamine radical is an ionized alkylene diamine.

5. The diamine modified copolymer of claim 4 wherein the alkylene diamine radical is ionized ethylene diamine.

6. The diamine modified copolymer of claim 4 wherein the diamine radical is ionized hexamethylene diamine.

7. The diamine modified copolymer of claim 3 wherein the diamine radical is ionized diethylene triamine.

8. The copolymer of claim 1 wherein the alpha,beta-ethylenically unsaturated acid is methacrylic acid.

9. The copolymer of claim 1 wherein the alpha,beta-ethylenically unsaturated acid is acrylic acid.

10. The copolymer of claim 1 wherein the diamine is bis(p-aminocyclohexyl)methane.

11. The product of claim 1 in the form of an extruded object.

12. The product of claim 1 in film form.

13. The product of claim 1 in funicular form.

References Cited

UNITED STATES PATENTS

| | | | |
|---|---|---|---|
| 3,165,486 | 1/1965 | Johnson | 260—29.7 |
| 3,264,272 | 8/1966 | Rees | 260—88.1 |
| 2,849,426 | 8/1958 | Miller | 260—78.5 |
| 3,071,565 | 1/1963 | Davis et al. | 260—88.1 |

HARRY WONG, Jr., Primary Examiner

U.S. Cl. X.R.

117—128; 260—33.6, 78.5, 79.5, 80.73, 80.75, 80.76, 80.78, 80.8, 176; 264—94

PO-1050
(5/69)

UNITED STATES PATENT OFFICE
CERTIFICATE OF CORRECTION

Patent No. 3,471,460                    Dated October 7, 1969

Inventor(s) RICHARD WATKIN REES

It is certified that error appears in the above-identified patent and that said Letters Patent are hereby corrected as shown below:

Column 11, Claim 1, line 15, X" should be -- R" ---.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents